March 22, 1960 R. E. BLAKELY 2,929,286
APPARATUS FOR SIMULTANEOUSLY STRIPPING JACKETING AND
SHIELDING SHEATHS FROM TWISTED-PAIR CABLE
Filed Sept. 26, 1957
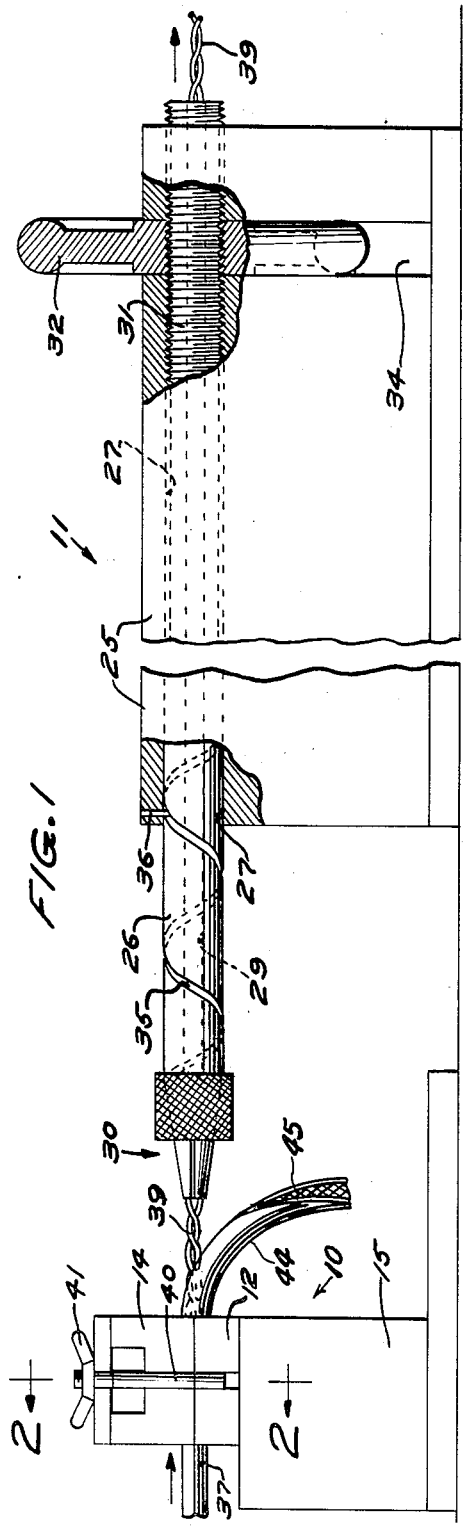
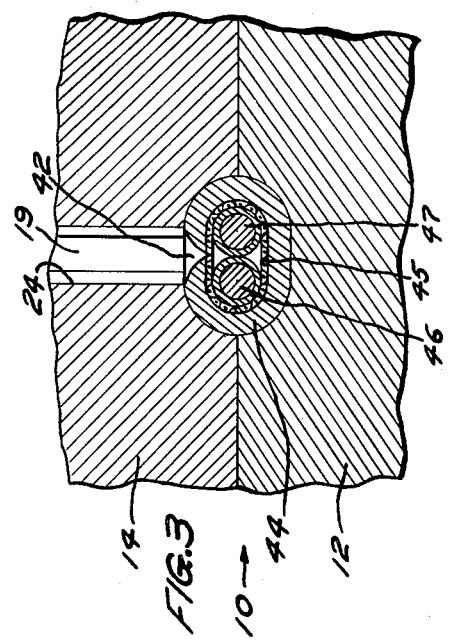
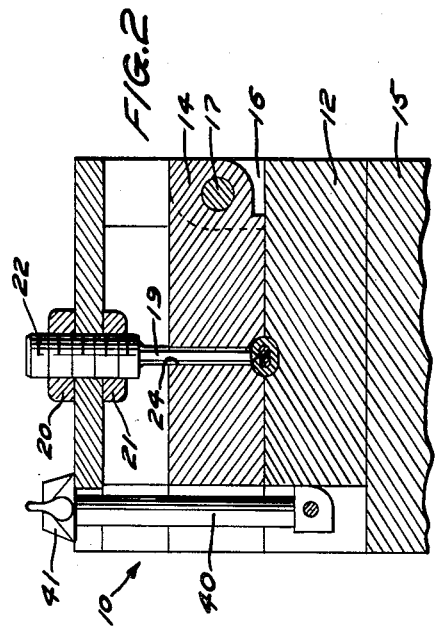
INVENTOR
R.E. BLAKELY
BY C.B. Hamilton
ATTORNEY

# United States Patent Office 2,929,286
Patented Mar. 22, 1960

2,929,286

APPARATUS FOR SIMULTANEOUSLY STRIPPING JACKETING AND SHIELDING SHEATHS FROM TWISTED-PAIR CABLE

Russel E. Blakely, St. Paul, Minn., assignor to Western Electric Company, Incorporated, New York, N.Y., a corporation of New York Application September 26, 1957, Serial No. 686,502

4 Claims. (Cl. 81—9.51)

This invention relates to wire stripping apparatus, and more particularly to an apparatus for simultaneously stripping the outer jacket and braided shielding sheaths from a twisted-pair cable.

In the past, it has been the practice to remove the jacketing and shielding sheaths from twisted-pair cables by hand, utilizing a pair of diagonal cutters or a similar tool. Satisfactory devices have been provided in the past for removing jacketing from parallel-lay type paired cables. However, to date, no satisfactory apparatus has been designed to facilitate rapid removal of jacketing and braided shielding from paired cables wherein the two conductors are twisted.

It is therefore a primary object of this invention to provide an apparatus which will facilitate rapid removal of the jacketing and braided shielding from twisted-pair cables.

It is another object of this invention to provide a stripping apparatus which includes a two-part stripping die with a cutting blade projecting into the cavity formed therein for severing cable sheaths.

It is a further object of this invention to provide an apparatus which will rotate a cable as it is being drawn through a stripping die.

With these and other objects in view, the present invention contemplates a two-part stripping die having a cutting blade projecting into the cavity formed therein and a hollow arbor provided with a split collet for pulling the cable through the stripping die. The hollow arbor is provided with a means for effecting longitudinal movement thereof and is further provided with a helical groove adapted to engage a stationary pin for imparting rotational movement to the arbor as the arbor moves longitudinally.

Other objects and advantages and novel features of the invention will become apparent upon consideration of the following detailed description in conjunction with the accompanying drawing wherein:

Fig. 1 is a front elevation view, partially in section, of an apparatus for stripping the sheaths from twisted-pair cables and embodying the principal features of the invention;

Fig. 2 is an enlarged sectional view taken along the line 2—2 of Fig. 1 and illustrating the cross-sectional configuration of the stripping die and the manner in which the stripping blade is mounted therein, and Fig. 3 is an enlarged view of a portion of Fig. 2 to better illustrate the stripping blade penetrating the outer jacket and the braided shielding of a twisted-pair cable.

Attention is now directed to the drawings wherein like numerals of reference designate the same parts throughout the several views and wherein is disclosed an apparatus for stripping the sheaths from twisted-pair cables formed of a stripping die unit and a cable rotating unit designated generally by the reference numerals 10 and 11, respectively.

The stripping die unit 10 is formed of fixed and movable die halves 12 and 14, respectively. The fixed die half 12 is secured to a stationary supporting member 15. The movable die half 14 is pivotally mounted on a projecting portion 16 of the fixed die half 12 by means of a pivot pin 17. The movable die half 14 mounts a stripping blade 19 which is held in place by means of lock nuts 20 and 21 on a threaded portion 22 of the blade 19. The lower portion of the stripping blade 19 is hexagonal in cross section and fits within a hexagonal aperture 24, formed in the movable die half 14, to assure proper alignment of the blade 19 relative to the longitudinal axis of a cable 37 being stripped.

The cable rotating unit 11 is formed generally of a stationary block 25 and a movable arbor 26 positioned within an aperture 27 formed in the block 25. The arbor 26 is provided with a longitudinal aperture 29 for receiving a stripped, twisted pair 39. The arbor 26 is also provided with a split collet 30 on the free extremity thereof for gripping the twisted pair 39 to pull the cable 37 through the stripping die unit 10. A threaded portion 31 on the opposite extremity of the arbor 26 mounts a hand wheel 32 in threaded relationship therewith for advancing the arbor 26 along its longitudinal axis. The hand wheel 32 is positioned within a groove 34 in the block 25, which groove is of such width as to preclude movement of the hand wheel 32 along the longitudinal axis of the arbor 26. The arbor is further provided with a helical groove 35 which has a lead equal to the lay of the twisted pair 39 within the cable to be stripped. A pin 36 is fixed to the block 25 and is positioned within the helical groove 35 to impart rotational movement to the arbor 26 as the arbor advances along its longitudinal axis.

Operation

In order that a better understanding of the invention may be had, its mode of operation will now be described. The jacketed and shielded twisted-pair cable 37 may be stripped manually to expose a length of twisted pair 39. The extremity of the twisted pair 39 is then positioned within the split collet 30 and the collet is tightened to firmly grip the end of the twisted pair therein. The twisted pair 39 is then placed in the cavity formed in the fixed die half 12, and the movable die half 14, which had previously been rotated to its open position, is moved to closed position shown in Fig. 2. A pivoted clamping bolt 40 is next moved to the vertical position shown in Figs. 1 and 2 and a wing nut 41 is tightened on the bolt 40 to firmly clamp the die half 14 against the die half 12. With the two die halves firmly clamped together, the unstripped portion of the cable within the die is distorted from its normally circular cross-section to the oval cross-section best illustratel in Fig. 3. Manifestly, this distortion will tend to rotate the cable to cause the wires therein to assume the position shown in Fig. 3, in which position the blade 19 will sever the sheaths without damaging the insulation on the individual wires.

The hand wheel 32 is then rotated in a direction to advance the arbor 26 to the right, as viewed in Fig. 1. As the arbor moves to the right, the stationary pin 36 engaging the helical groove 35 imparts rotational movement to the arbor 26 and hence to the collet 30 to maintain that incremental length of the pair of wires which is beneath the blade 19 in the position shown in Fig. 3. After the arbor has been somewhat advanced, the unstripped portion of the cable 37 will reach the stripping blade 19 (Fig. 3). Continued movement of the arbor 26 to the right will then cause the tip 42 of the blade 19 to penetrate the jacketing 44 and braided shielding 45 surrounding the insulated wires 46 and 47 at a point where the insulation on the wires will not be damaged. The jacketing 44 and braided shielding 45 tend to open up when cut and thus will fall away from the twisted pair 39 as illustrated in Fig. 1. If the jacketing and shielding adhere to the twisted pair after exiting from the stripping die 10, they may be manually separated from the twisted pair. Since the helix angle of the groove 35 is equal to the lay of the twisted pair 39, the incremental lengths of wire which move beneath the blade 19 will always be maintained in the position shown in Fig. 3 and thus the tip 42 of the blade 19 will never cut the insulation on the wires 46 and 47. This action is supplemented by the rotational forces imparted to the cable by the distortion due to the oval shape of the die cavity as was previously explained. Thus, any length of twisted-pair cable may be rapidly stripped of the jacketing and shielding sheaths in a single operation, without any fear that the insulation on the indivdual wires will be damaged.

As an alternative method, the cable may be inserted into the apparatus through the hollow arbor 26, the split collet 30 and the opened die unit 10 until the length of cable which it is desired to strip project to the left in Fig. 1 beyond the die unit 10. The cable is then stripped as hereinbefore described and when the end of the cable clears the die unit 10, the desired length will have the jacketing and shielding stripped therefrom. Loading the cable into the apparatus in this manner precludes the necessity for manually stripping a short length of the cable prior to insertion in the apparatus as previously described.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for stripping a sheath from a twisted-pair cable comprising means for slitting the sheath longitudinally of the cable, means for gripping an extremity of the cable, means for advancing said gripping means along its longitudinal axis to pull the cable through said slitting means, and means operable upon longitudinal movement of said gripping means for rotating said gripping means in a helical path having a lead equal to the lay of the twisted pair.

2. An apparatus for simultaneously stripping jacketing and braided shielding from a twisted-pair cable comprisng a die having an aperture therein for receiving a cable to be stripped, a stripping blade projecting from one side of the die into said aperture and toward the center thereof, means for moving the cable through said die, and means for rotating said moving means simultaneous with longitudinal movement thereof to cause any point on said moving means to describe a helical path which is equal in lead to the lay of the twisted pair.

3. An apparatus for simultaneously stripping jacketing and braided shielding from a twisted-pair cable comprising a base, a die fixed to said base and provided with a cavity therethrough for receeiving a cable to be stripped, a stripping blade mounted in said die and projecting into said cavity for slitting the jacketing and braided shielding longitudinally of the cable, a hollow arbor for receiving and gripping an extremity of the cable, the outer wall cf said arbor being provided with a helical groove having a lead equal to the lay of the twisted pair, means mounting said arbor on said base, means for advancing said hollow arbor through said mounting means to draw the cable through said die, and a pin fixed to said mounting means and positioned within the helical groove for imparting rotational movement to said arbor as it moves through the mounting means under the influence of said advancing means whereby a plane containing the longitudinal axes of the successive incremental lengths of said twisted-pair cable positioned beneath said stripping blade is maintained perpendicular to the longitudinal axis of said blade.

4. An apparatus for simultaneously stripping jacketing and braided shielding from a twisted-pair cable comprising a die having an aperture therein for receiving a cable to be stripped, a stripping blade projecting from one side of the die into said aperture and toward the center thereof, a hollow arbor for receiving and gripping an extremity of the cable, means for advancing said arbor to draw the cable through said die, and means cooperable with said advancing means for rotating said arbor so that the arbor describes a helical path having a lead equal to the lay of the twisted-pair.

References Cited in the file of this patent

UNITED STATES PATENTS

| | | |
|---|---|---|
| 1,498,616 | Foulder | June 24, 1924 |
| 1,641,822 | Mattson | Sept. 6, 1927 |
| 1,835,597 | Hill et al. | Dec. 8, 1931 |
| 1,998,391 | Shaw | Apr. 16, 1935 |
| 2,624,221 | Schneider | Jan. 6, 1953 |
| 2,873,489 | Hirschhorn | Feb. 17, 1959 |

FOREIGN PATENTS

| | | |
|---|---|---|
| 555,448 | Great Britain | Aug. 24, 1943 |